Oct. 7, 1930.                F. C. MOCK                1,777,414
                        SPRING CONTROL DEVICE
                    Filed Oct. 15, 1925    5 Sheets-Sheet 1
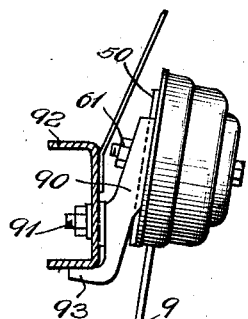
Fig. 2.
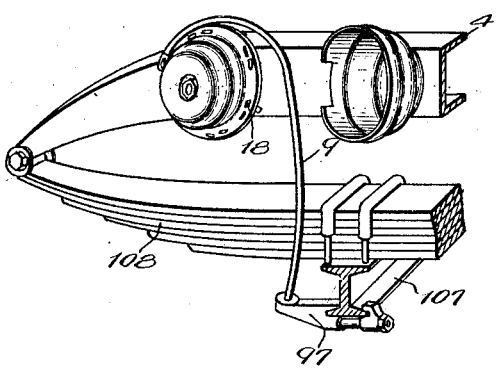
Fig. 1.
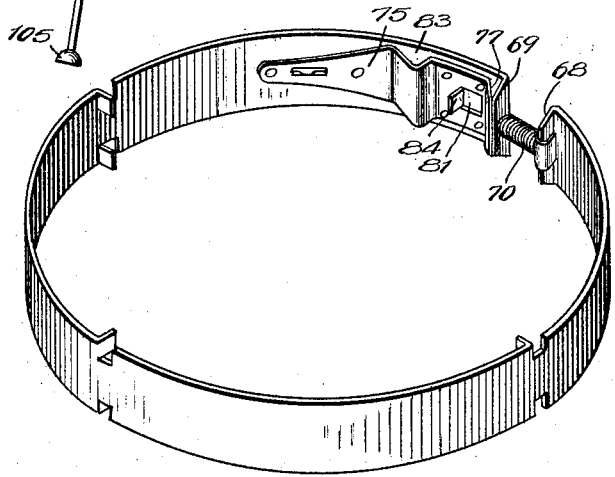
Fig. 11.
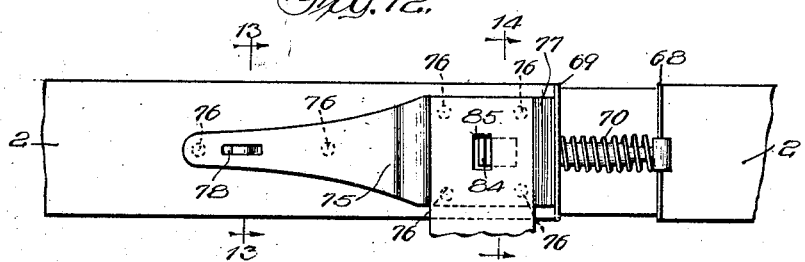
Fig. 12.
Fig. 13.   Fig. 14.
Witnesses:
William P. Kilroy
Harry R. L. White.
Inventor
Frank C. Mock Oct. 7, 1930. F. C. MOCK 1,777,414
SPRING CONTROL DEVICE
Filed Oct. 15, 1925  5 Sheets-Sheet 2
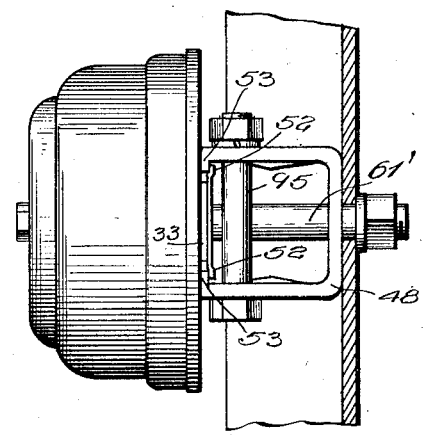
Fig. 4.
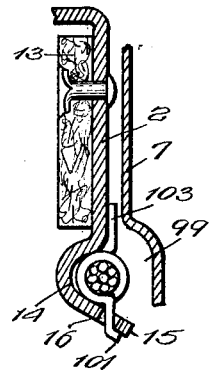
Fig. 10.
Fig. 8. Fig. 7.
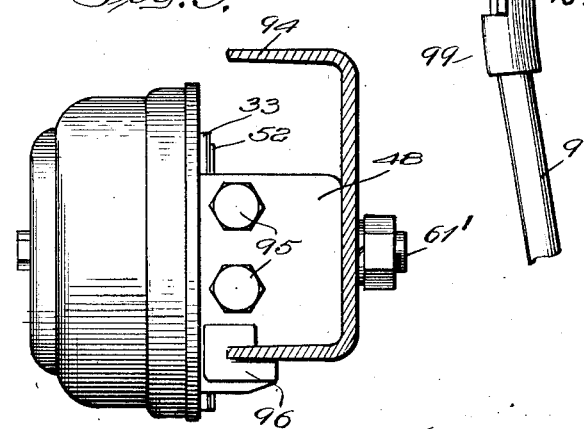
Fig. 3.
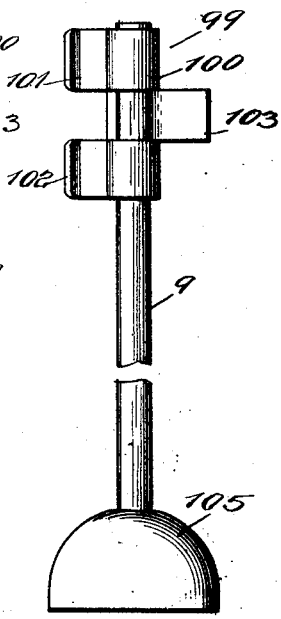
Fig. 9.
Inventor
Frank C. Mock

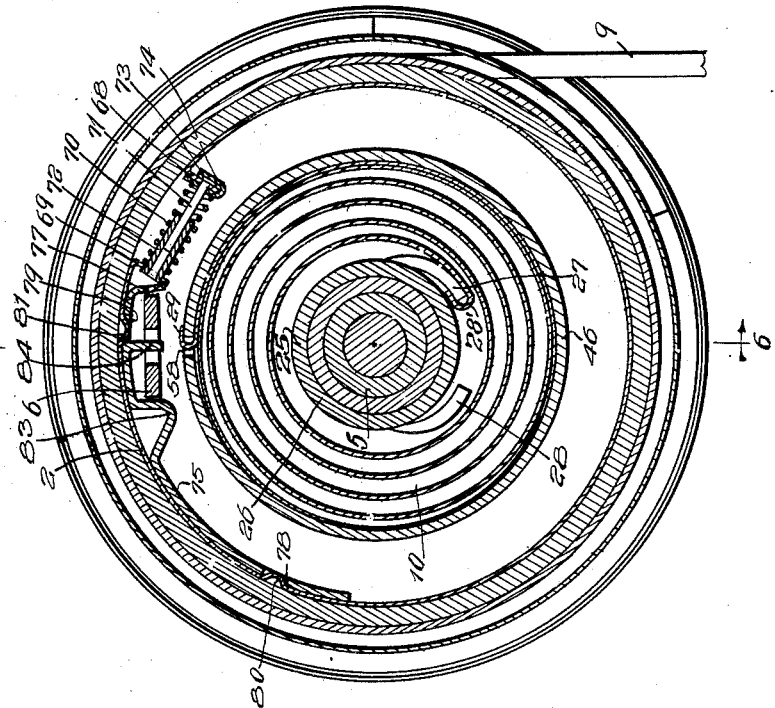

Oct. 7, 1930.                F. C. MOCK                 1,777,414
                         SPRING CONTROL DEVICE
                     Filed Oct. 15, 1925    5 Sheets-Sheet 4
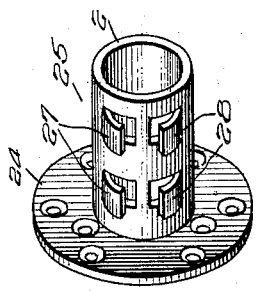
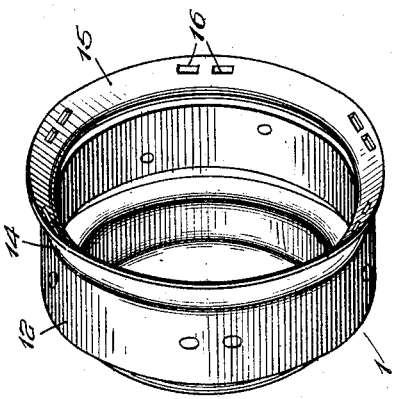
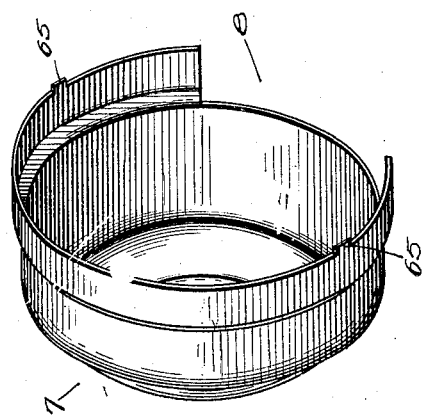
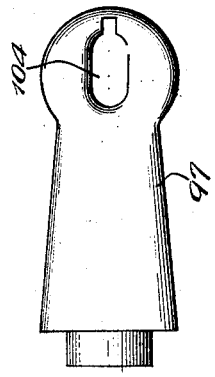
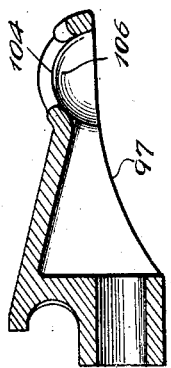
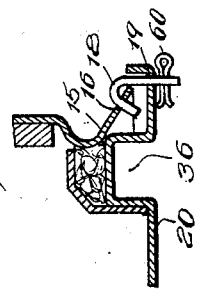
Inventor
Frank C. Mock Oct. 7, 1930.  F. C. MOCK  1,777,414
SPRING CONTROL DEVICE
Filed Oct. 15, 1925   5 Sheets-Sheet 3
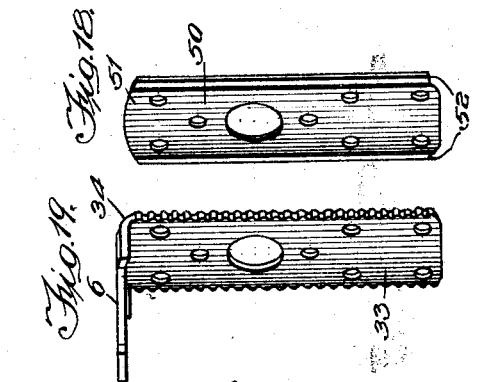
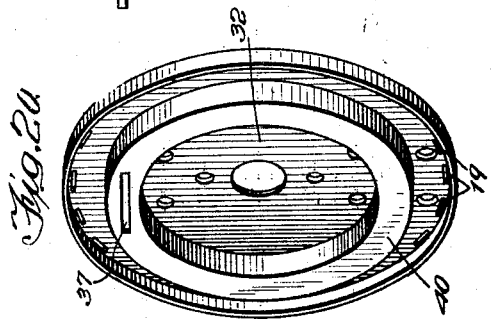
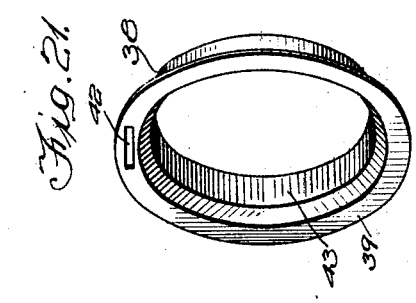
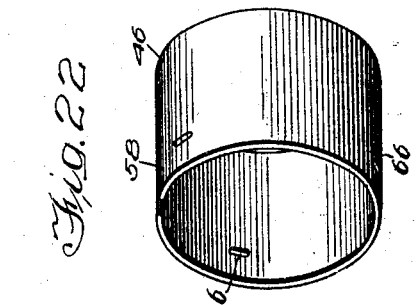
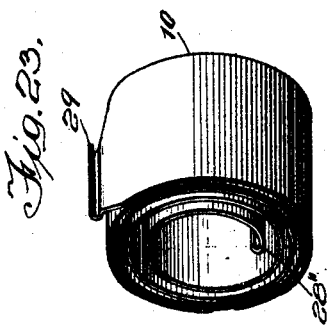
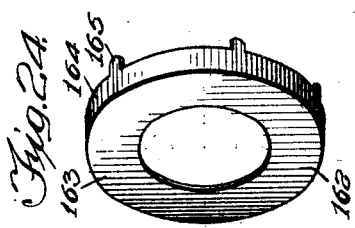
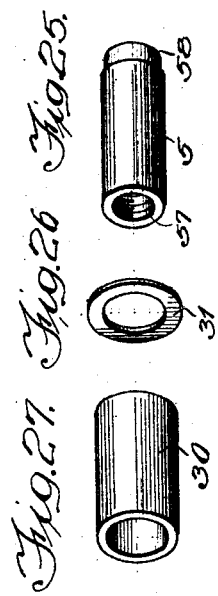
Witnesses:
William P. Kilroy
Harry R. LeWhite
Inventor
Frank C. Mock Patented Oct. 7, 1930

1,777,414

UNITED STATES PATENT OFFICE

FRANK C. MOCK, OF CHICAGO, ILLINOIS, ASSIGNOR TO BENDIX STROMBERG CARBURETOR COMPANY, OF CHICAGO, ILLINOIS, A CORPORATION OF ILLINOIS

SPRING-CONTROL DEVICE

Application filed October 15, 1925. Serial No. 62,501.

This invention relates to spring control devices for motor vehicles, popularly termed "shock absorbers."

The present invention aims to provide a simple and effective spring controller. To compete on the open market, it is desirable to reduce the cost of production and application of the device; to provide a device which is amply strong mechanically and which will stand up under severe duty and at the same time be easily serviced; to make a neat and attractive job.

The present invention comprises an improvement upon the device disclosed in co-pending application Serial No. 729,459, filed August 1, 1924.

In my study of devices of this class, I have found that while a variable friction or resistance proportioned to displacement for governing the recoil of the spring is desirable and effective, such mode of operation involves the handling of stresses which rise to relatively high magnitude and, although they are substantially instantaneous and of short duration only, they require a heavy and expensive construction. I have found also that where the lever or toggle type is employed, the leverage upon the friction element requires the friction element to be made relatively large and, hence, heavy and expensive. In the lever or toggle type it is necessary to have relatively long arms in order to permit sufficient spring play, that is, sufficient movement between the body and the axle to permit of free use of a long flexible spring.

The longer the arm, the greater is the leverage upon the friction element.

In the development of the present device, I have, therefore, employed the cable and drum construction which permits the friction element to work at a ratio of substantially one to one with respect to the spring rebound force or pressure. This means that the friction need not be substantially greater than the force of the spring recoil which it is to control or oppose.

In the present device I have not abandoned the variable friction principle, but have modified it by introducing a friction which varies with velocity somewhat in the nature of a hydraulic controller. I find that position is not as suitable a control for devices of this character as is velocity.

While a hydraulic controller under ideal conditions may give the desired characteristic of low resistance for slow relative movement and higher resistance for more rapid movement, such controllers are expensive to construct and service and are adversely affected by many variable and uncontrollable factors. They do not meet the public demand.

I have endeavored in the present controller to obtain in a mechanical friction device the desirable characteristics exhibited by the hydraulic controller under ideal conditions. For a suitable mechanical friction controller, it is not sufficient that the total friction merely increase in direct proportion to the velocity of relative movement, but the total friction should increase more rapidly as, for example, according to some exponential function of the speed of relative movement. I am aware that there are other controllers that aim to secure increased friction for increased speed of relative movement as, for example, a pull which is twice as great for rapid relative movement as compared to slow relative movement, but that is not enough. I have found by experiment that the occupant of a car can readily feel the application of an upward pressure of 50# per wheel. I have also found that the controller must exert a resistance of considerably more than 100# per wheel upon rapid upward throw of the body. Now, in devices of the prior art which have a total friction variation of only two to one, the result is first that the desired maximum friction cannot be obtained and hence the throw of the body is too violent, and second the residual or slow resistance keeps the vehicle spring under too great restraint with the result that the car rides harder with the controller than without it, for small irregularities of the road.

To secure the desired result of greater effective friction range and hence adequate control for rapid throw of the body and minimum restraint of the vehicle spring for slow relative movement of the body, I have devised a practical and commercially useful combination of, first a friction couple which has a coefficient of friction that is variable with velocity, and second a means for compounding the effect of said variable co-efficient of friction. The result is a mechanical friction which in the preferred embodiment hereafter to be described has a range of the order of five to one of the resistance offered to rapid relative movement as compared to the resistance offered to slow relative movement. For example, the spring controller of my invention affords for slow relative movement a resistance of about 25 pounds and this is increased to 150 pounds for rapid relative movement.

The means which I provide for gaining a practical velocity control of the co-efficient of friction resides in certain forms of fibrous friction materials in contact with a smooth steel or metal surface, the same constructing an enclosed expanding brake. I find that leather with its grain side against the smooth metal surface gives excellent velocity control of the co-efficient of friction. I find that cork has a similar characteristic, but is less effective. I find that rubber and rubber impregnated fabrics or fibrous bodies have a similar characteristic.

I am aware that the use of an external self contracting brake using a leather friction material is old, as is shown, for example, in Patent No. 1,254,674, but the full advantages of the present invention have not heretofore been realized.

The means whereby I secure the compounding effect for suitably multiplying the effect of such variable co-efficient of friction upon itself is a flexible self applying internal expanding brake band placed under a small initial expanding tension and moved by pushing against one end thereof. It is to be observed that by my construction I am able to use the drum both as a friction drum and as a housing. Also, I wrap the cable upon the outside of the drum and thereby secure a triple use of the drum. The expansible shoe is held against rotation and the drum is rotated in one direction by pull on the cable which automatically applies the friction as aforesaid, and it is rotated in the opposite direction by a suitable retrieving spring which automatically throws off the friction.

The particular arrangement of mounting the leather facing upon the drum and of employing a thin flexible steel band or shoe is highly advantageous, as the band may be obtained on the market as a smooth finished bar which has the grain running in the longitudinal direction and hence ideal as a braking surface. The thinness and flexibility of the band is highly desirable to cause it to fit itself accurately to the variations of radius of the leather lining. The stress upon the brake band builds up from the free end to the anchor end. I have provided a graduated reenforcement increased toward the anchor end both to secure a more firm anchorage, and also to provide a stiffer spring to withstand the greater pressure.

The present device, in addition to embodying the novel principle of a velocity controlled and self compounded friction and particularly in a drum and cable type, embodies numerous improvements in structure, perhaps most notable of which are the following:—

1. The pressed steel friction and cable drum;
2. Location of the cable adjacent the attaching face of the device;
3. The novel cable attachment to the drum;
4. The pressed steel bracket, one end of which anchors the friction shoe and the other end of which is rigidly secured to the support;
5. The seal between the movable drum and the stationary casing;
6. The anchorage of the spring on the stationary hub to permit of either left or right attachment;
7. The holding of the spring against expansion during application of the device to the car;
8. The construction of the stationary shoe and its expanding spring;
9. The bracket mounting for the device;
10. The application and fastening of the cover after the device is installed.

There are numerous other improvements which will be apparent to those skilled in the art.

In order to acquaint those skilled in the art with the manner of constructing and operating a device embodying my invention, I shall now describe in connection with the accompanying drawings a specific embodiment of the same.

Figure 1 is an isometric view showing the manner of applying a shock absorber according to my invention to the frame and axle of a vehicle;

Fig. 2 is a front elevational view of a device of my invention mounted upon the frame of a vehicle through the intermediary of a suitable mounting bracket;

Fig. 3 is a similar front elevational view showing a modified form of mounting of the device upon the frame of a vehicle;

Fig. 4 is a plan view of the same with the frame partly cut away to show the formation of the mounting bracket;

Fig. 5 is a vertical transverse section through a device embodying my invention;

Fig. 6 is a vertical longitudinal section taken on the line 6—6 of Fig. 5;

Fig. 7 is a side elevational view of the cable with the lugs at the upper end for attaching to the drum of the device and the button at the lower end for connecting the same to a bracket on the axle, as shown in Fig. 1;

Fig. 8 is a side elevational view of the connecting member at the upper end of the cable shown in Fig. 7;

Fig. 9 is an end view of said attaching device on the end of the cable;

Fig. 10 is a fragmentary sectional view showing the manner of hooking the attaching sleeve on the upper end of the cable to the drum of the controller;

Fig. 11 is an isometric view of the band and expanding spring which forms the stationary shoe;

Fig. 12 is a developed or flat view of the adjacent ends of the band shown in Fig. 11;

Figs. 13 and 14 are sections taken on the lines 13 and 14 of Fig. 12;

Fig. 15 is an isometric view of the bearing sleeve which is nested with the drum shown in Fig. 16, and which contains inside of it the wooden liner or block shown in Fig. 27;

Fig. 16 is an isometric view of the drum which nests with the bearing sleeve shown in Fig. 15 and is covered in turn by the housing shown in Fig. 17;

Fig. 17 is an isometric view of the housing which co-operates with the base plate shown in Fig. 20 to enclose the operating parts of the controller;

Fig. 18 is a guide plate which is secured on the rear side of the bracket member shown in Fig. 10;

Fig. 19 is an isometric view of the bracket, the rear part of which is secured to the back of the base plate shown in Fig. 20, and the upwardly extending arm of which projects through the slot of said base plate and holds the brake shoe against rotational movement;

Fig. 20 is an isometric view of the base plate which co-operates with the cover shown in Fig. 17 to form the housing;

Fig. 21 is an isometric view of a retaining ring which retains a ring of felt between its flange and an adjacent flange on the base plate shown in Fig. 20;

Fig. 22 is the barrel shown in isometric elevation, for containing the retrieving spring shown in Fig. 23, this barrel being nested with the base plate shown in Fig. 20 and having the cover shown in Fig. 24;

Fig. 23 is an isometric view of the retrieving or return spring, which is adapted to be nested in the barrel shown in Fig. 22, and the inner end of which is connected to the hooks on the bearing sleeve shown in Fig. 15.

Fig. 24 is a cover for the barrel as shown in Fig. 22 for enclosing the retrieving spring shown in Fig. 23;

Fig. 25 is an isometric view of the bearing pin, the rear end of which is secured to the bottom of the base plate of Fig. 20 and the bottom of the bracket shown in Fig. 19;

Fig. 26 is a washer which fits over the end of the pin, as shown in Fig. 25, and takes the end play of the bearing sleeve of the drum;

Fig. 27 is a wooden liner or bearing sleeve which fits over the pin shown in Fig. 25 and which is secured within the bearing sleeve, as shown in Fig. 15;

Fig. 28 is a plan view of the bracket for securing the lower end of the cable to the axle;

Fig. 29 is a vertical section through the same; and

Fig. 30 is a fragmentary section of the drum showing the key for holding the drum during shipment.

The device herein shown and described is a controller affording friction for controlling the expansion of the vehicle spring and presenting minimum resistance to the retrieving or return spring, which merely takes up the slack of the cable. To this extent it is of the unbalanced or unidirectional type. The variations of friction secured upon the friction stroke will be explained more in detail later.

The specific embodiment which is shown herein is made up, to as great an extent as possible, of sheet metal stampings. It will be apparent, as this description proceeds, that the parts might be made of cast metal, but the design of the parts herein permits of accurate and rapid manufacture and to be assembled quickly and readily into a structure of ample strength.

There are two essential parts in this controller, namely, the movable friction drum 1 and the stationary automatic expanding band or shoe 2. These parts must be relatively movable and, while I show an embodiment in which the drum moves and the band stands still, I do not wish to be limited to this specific arrangement.

The stationary band 2 of the present embodiment is held stationary by a frame or base member, generally designated 3, which is a compound or built up structure in the present embodiment, but which might be all one casting if so desired. This base or frame 3, which is stationary and is secured to the vehicle frame 4, as indicated in Fig. 6, provides a stationary bearing member, in this case a pin or stud 5 shown separately in Fig. 25. The frame or base member 3 also provides an actuating or holding arm 6 for holding against rotation the stationary brake band 2.

A cup shaped housing member 7, shown separately in Fig. 17, co-operates with the base member 3 to form a housing which is substantially closed except for a slot, indicated at 8, through which passes the actuating cable 9, shown separately in Fig. 7.

There is a retrieving spring 10 secured at its outer end to the base or frame member 3, and at its inner end to the rotatable drum member 1, and this spring does two things, first it collapses the band or shoe 2 to decrease its friction and, second, retrieves the cable 9, thereby keeping it constantly taut.

It is an important feature of the invention to make this drum member, or at least the movable member whether it be the drum or band, of relatively small inertia with respect to its retrieving spring, so that the spring is able to take up instantly the slack in the cable 9 so that the device may work at relatively high speed as, for example, when the automobile is driven at a rapid rate.

Now in order to make clear the construction of the device sectioned in Figs. 5 and 6, we shall describe the various main features in detail. The drum member 1, which is herein rotatable, employs a drawn sheet metal bell shown in Fig. 6, this bell comprising first a cylindrical drum member 12, the inside of which is lined with a strap of leather of approximately one-eighth inch or three-sixteenths inch thickness with the grain or hair side facing inwardly to provide the friction surface, and the flesh side being disposed against the internal periphery of the cylindrical part 12. This drum member 1 has a round groove or inwardly extending bead 14 adjacent the mouth of the bell, this groove running into a flared lip or flange 15 which extends out conically, as will be apparent from Figs. 6 and 16. This flange or lip 15 has punched therein about its periphery, preferably at six equidistant points, pairs of rectangular openings 16 for the attachment of the upper end of the cable 9 by the attaching means illustrated more in detail in Figs. 7, 8, 9 and 10.

These slots 16, in addition to serving as slots for the attachment of the upper end of the cable 9, serve furthermore as means for holding the drum with respect to the base member 3, as will be described more in detail later, to prevent unwinding of the retrieving spring while the device is being shipped and mounted upon the vehicle. This means comprises a key 18, shown in Figs. 1 and 30, which key is bent into an inverted J, the short legs thereof projecting into one of the slots 16, and the longer leg projecting through a slot such as 19 in the adjacent part of the base plate 20, shown separately in Fig. 20. This base plate 20 is a part of the base or frame 3.

I consider the provision of the plurality of pairs of openings or slots 16 for the attachment of the cable to be of importance. This provides a relatively fine adjustment for the angular position of attachment of the cable which is highly desirable. Within the limitations of space available in a device of this character it is difficult to get a retrieving spring of adequate strength that will stand more than one-half turn beyond the limit of motion which the car body will take. Where, as in the present case, the cable or tension member is made a separate unit of fixed length it is advantageous to have the adjustment, which is afforded by the series of slots, particularly since the shock absorber is supplied, wound up to a fixed angular position, and the permissible expansion of the retrieving spring is limited.

At the front of the drum member 1 or to the right as viewed in Fig. 6, the wall of the drum is formed radially as indicated at 21, and then extends out in the form of a short cylinder 22 and thence with a gentle curvature or fillet the sheet metal is formed into a radial end wall at 23 to form a suitable attaching web for the base or flange 24 of the sleeve member 25, which serves as a bearing sleeve for the drum member 1. The sleeve 25 comprising a tubular portion 26 and a base or flange 24, all integrally formed or drawn from a disc of sheet metal. The base or flange 24 of the sleeve member 25 is riveted to the head or end 23 of the drum member 1, so that the drum member 1 and said tubular sleeve member 26 are mechanically integral. It will be observed that the head 23 is apertured at the center and the edges of the aperture turned in to assist in centering the sleeve member 25 with respect to the head of the drum.

The sleeve member 25 has two pairs of lugs cut out of the side walls thereof, one pair such as 27 being adapted to be engaged by the hook 28' (see Fig. 23) on the inner end of the spring 10 when the device is adapted for the right hand side of the car or automobile, and the other pair, such as 28 being adapted for attachment of the inner end 28' of the spring 10 for the left hand side of the automobile, or vice versa.

This bearing sleeve 26 is adapted to be supported for rotary or oscillatory motion on the pin 5 and a wooden liner or anti-friction bearing 30, which is preferably a dense wood such as maple or the like, impregnated with lubricating material, is pressed into the bearing sleeve 26. Due to the use of the wood facing or liner, lubrication of the bearing sleeve 26 on the pin 5 is not required.

A hardened steel washer 31 takes whatever end thrust there may be and the consequent wear between the end of the wood sleeve 30 and the stationary base or frame member 3.

The base or frame member 3 is a compound structure built up of a plurality of sheet metal stampings and, as heretofore explained, this base or frame member might be made of one piece as by casting, or the like, although I find that a much stronger and lighter structure may be produced by the use of metal stampings such as I have herein shown. This base or frame member 3 comprises a base plate which is a circular disc 20, shown in Fig. 20. This disc is a composite form comprising a central plate 32 which, as will be explained later, is riveted to the base 33 of bracket member 34, which bracket member 34 has an arm 35 extending parallel to the axis of the pin 5 into a position to hold the relatively stationary end of the strap or shoe 2. The base plate 20 has a raised rib 36 formed circumferentially thereof, this rib in section as shown in Fig. 6 being generally rectangular.

The arm 6 of the bracket 34 projects up through a slot 37 which is formed in the bead 36 of the base plate 20. There is a packing retaining ring 38 shown in Fig. 21 which nests with the base plate 20, this ring having a radial flange 39 between which and the adjacent radial face 40 of the plate 20 there is provided a felt packing ring 41. The packing ring 41 forms in conjunction with the inner wall of the groove 14 a seal between the moving drum 1 and the stationary frame member 3 to keep foreign matter out of the interior of the device. The retaining ring 38 has a slot 42 therein which passes over the reduced portion of the arm 6 of the bracket member 34. The retaining member 38 has a cylindrical portion 43 which nests with the cylindrical wall 44 of the base plate 20 and this cylindrical wall has a short inturned flange which is caught under the radial wall 45 of the spring cup or housing 46 which is shown in a separate view in Fig. 22. This short inturned flange at the end of the cylindrical wall 43 is caught under the corner of the spring cup or housing 46 and it retains the retainer 39 in position.

The side edges of the base 33 of the bracket 34 are provided with notches or teeth to permit of engagement with co-acting teeth on the clamping bracket 48, shown in Figs. 3 and 4. Back of the base 33 of the bracket 34 there is provided a plate 50 having a central flat portion 51 of slightly less width than the width of the base 33 of the bracket 34, and having at its edges flanges 52 extending a short distance laterally beyond the teeth on the corresponding edges of the base 33 of the bracket 34. The purpose of these flanges 52 is to prevent lateral disengagement of the clamping teeth 53 on the edges of the bracket 48 from the teeth on the edge of the base member 33 of the bracket member 34.

The retaining plate 50, the base 33 of bracket 34, the base plate 20, and the bottom wall 45 of the spring cup or housing are all connected together by rivets such as shown at 55 in Fig. 6. In addition, the outer rim of the base plate 20 beyond the bead 36 is secured to the lower end of the base 33 of bracket 34 by rivets indicated at 56 in Fig. 6. Thus, the spring cup, the base plate 20, and the bracket 34 with the projecting arm 6 are all connected together to be mechanically integral. The pin 5 which is shown separately in Fig. 5 has threads at its outer end as shown at 57 and is relieved along the center part for the sake of clearness. At its rear end it is reduced, as indicated at 58, to provide a riveting shoulder engaging the bottom part 45 of the cup 46 and extending through apertures in the cup, the base plate 20, the base 33 of the bracket 34, and the retaining plate 50 being riveted over at its rear end for the dual purpose of uniting these parts firmly and also for providing a rigid mounting for said bearing stud or pin 5.

The retrieving spring 10 has its outer end 29 hooked over one edge of the slot 58 formed in the side wall of the cup 46. The opposite end 28 of the spring 10 is hooked over the fingers 27, as indicated in Fig. 5, and the drum is then rotated to bring the retrieving spring 10 under suitable tension.

In order to hold the spring under tension while the device is shipped and while it is being attached to the automobile, the key 18 is inserted into one of the slots 16 in the flange 15 of the drum 1, and a co-operating slot 19 formed in the adjacent part of the base plate 20, as shown in Fig. 30. The key member 18 has a cotter pin 60 passed through the end thereof, as shown in Fig. 30, to prevent disengagement of the key from either of the co-operating parts. The controller may be mounted upon the frame of the vehicle as shown in Fig. 1, and the cable 9 connected between the drum and the stationary bracket on the axle and then the key 18 may be removed whereupon the tension of the spring 10 tightens the cable and the device is ready for operation.

The stud 5 is hollow and is adapted to receive either a through bolt 61 which may pass through a mounting bracket and the frame 4 of the vehicle, as shown in Fig. 6. The head 62 of said bolt 61 bearing against the outer end of said stud or pin 5, or if the controller is held on a bracket without the use of a through bolt a short cap screw is threaded into the threads 57. The bolt 61 is drilled to receive the cap screw 63 which holds the cover member 7 in place. This cover member 7 is a sheet metal shell having a slot therein at one side and this side may be brought into register with the cable 9 so that free play of the cable in and out through the slot 8 may occur.

The cover 7 has a reenforcing plate 64 secured on the inside adjacent its center, this reenforcing plate performing the dual function of reenforcing the central part of the shell or housing 7 and also forming a suitable wear plate engaging the adjacent surface of the shell or drum 1. Thus the axial movement outwardly of the drum 1 is limited by the wear plate 64 and the axial movement inwardly is limited by engagement with the washer 31, shown in Fig. 26. The shell or housing member 7 is provided with two or more extending ears 65, as clearly shown in Fig. 17, and these ears or lugs are adapted to be passed through openings such as 19 in the base plate 20 and to be turned over or clinched to retain the cover member 7 in place. The holes 19 in the periphery of the base plate 20 are so arranged that the slot 8 in the shell or cover 7 may be placed either left or right, and a number of such slots are so diametrically arranged that the slot in the cover 7 may be adjusted on either side to suit the manner in which the cable is led out from the groove on the drum.

The extreme periphery of the base plate 20 has a flange extending axially of the device to center the open end of the housing or cover 7 and to cover the seam between the two parts.

It is to be observed that the cover shell 7 is kept from turning when the drum 1 turns because said shell 7 is keyed to the base plate 20 by the lugs or ears 65. This makes it possible to lock the whole center bolt structure securely by drawing up the small screw. It is the present practice to put a lock washer under the head of the cap screw 63 so that the cap screw is locked to the outside of the cover shell 7, and it is in turn keyed to the base plate. If this cover were not thus provided, there would be likelihood of the drum 1 coming off of the stud 5 endwise, because any nut that would be put upon the end of stud 5 would tend to turn by the friction with the drum as it is rotated.

The spring 10 is retained in the cup 46 by a cap 162 which is shown separately in Fig. 24. This cap comprises a radial ring 163 and a cylindrical flange 164 from which cylindrical flange there are a number of integral lugs or ears 165 extended axially of the controller. These ears are adapted to be bent or clinched into corresponding slots or openings 66 in the spring cup 46. By this cap axial displacement of the spring 10 is prevented.

The stationary shoe or strap 2, which cooperates with the leather facing 13, is made of a thin strip of metal preferably spring steel. This strip or shoe covers substantially the entire interior surface of the drum circumferentially in order to provide maximum efficiency and smoother operation.

As above explained the engagement of the smooth steel band or shoe with the leather facing provides a co-efficient of friction which increases with increased velocity of relative movement, and to secure this effect the surface rubbing against the leather must be dry and smooth. It is less expensive to secure this surface finish in the sheet metal from which the brake band is made than to finish the interior of the drum 1. The interior of the drum is roughened somewhat by the various drawing and pressing operations. The attachment of the lining of leather on the inside of the drum also leaves the flexibility of the band 2 unimpaired.

The ends of the steel band are bent up substantially radially, as indicated at 68 and 69 (see Figs. 5, 11 and 12). A helical compression spring 70 lies between the upturned ends 68 and 69 and tends to expand the shoe or strap into engagement with the friction surface of the drum. The spring is retained in place by a guide comprising a pin 71 and a sleeve 72 connected, respectively, to the lugs or ears 68 and 69. The pin 71 has a head lying back of the lug 68 and a sheet metal retaining clip 74 has an opening which is threaded over the pin 71 and is then bent over the upper edge of the lug 68 behind the head 73 of the pin 71. Thus the pin 71 is held against longitudinal displacement and, at the same time, the pin 71 holds the clip 74 against lateral displacement. The sleeve 72 has its end flared out to form a head back of the lug 69 and it is held against longitudinal movement backward by a reenforcing strap 75, which strap 75 is suitably spot welded as indicated by the dotted circles in Fig. 12. This reenforcing strap 75 is suitably formed to the general contour of the inside of the strap when it is in position in the drum, and it has its one end bent upwardly at 77 back of the lug 69, the enlarged end or head of the sleeve 72 being thus held between the end 77 of the strap 75 and the end or lug 69 on the band 2. The reenforcing strap 75 is centered for the welding operation by means of slots 78 and 79. Corresponding loops 80 and 81 are struck up from the body of the band 2 to register with the slots 78 and 79 of the reenforcing strap 75. The reenforcing strap 75 is further formed to provide a seat for the arm 6. This seat for the arm 6 is defined on the one side by the upturned end 77 and at the other side by the loop 83, said loop 83 having its side adjacent the arm 6 formed substantially radially so as to secure a good bearing against the edge of the arm 6.

It is important for securing the compounding action of the internal expanding flexible brake shoe to permit free radial movement or floating of the anchored end of the brake band so that the full acting circumference of the band be used and also that accurate fitting of the shoe to the surface of the leather be accomplished. Likewise, radial floating of the anchored end is necessary to release the friction upon the retrieving motion. In my prior application aforesaid I obtain such action by a link connection, but I secure the same herein by placing the arm 6 in the notch or saddle of the reenforcement 75.

The reenforcing strap 75 is made of spring metal, somewhat thicker than the metal of the strap or band 2, and when the parts are welded together as aforesaid they provide a structure of considerable strength. The strap or band 2 is restrained from motion axially with respect to bracket arm 6 by means of a lug or ear 84 which is struck out of the slot or opening 79, and which lug or ear 84 extends into a corresponding slot or opening 85 in the arm 6. Axial motion of the strap 2 is prevented by the radial wall 21 at one side and by lugs struck up from the edge of band 2 engaging the retaining ring 38 on the other side. The reenforcing strap 75 is tapered off in width as the strap extends away from the seat for the arm 6. The purpose of the seat for the arm 6 is to hold the adjacent end of the strap against rotary motion in either direction. The arm 6 permits the end of the shoe or band 2 to float radially, but restrains motion thereof rotarily.

The tapered reenforcement 75 is arranged to provide a graduated increase in the stiffness of the spring band 2 to meet the piled up stress, which results from the compounding action previously mentioned.

Attention is now called to the fact that in the construction of this controller thus far described the parts may be assembled for left or right operation, as may be desired, without any change in structure. The spring 10 may be connected between the sleeve 26 and the stationary spring drum or housing 46 to move the drum in the direction desired either clockwise or counter-clockwise. The shoe or band 2 may be assembled either for left or right rotation without any change in structure. The cover 7 may be placed on for either left or right operation without change in structure. In Fig. 6 I have shown the controller as mounted by means of the through bolt 61 upon the frame member 4 in which case a suitable L-shaped bracket 87 serves as a means for keying the controller to the frame 4 to prevent rotation. The vertical leg of the bracket 87 has flanges extending axially of the controller for bracing the sides of the retaining plate 50, and the horizontal leg extends below the lower web of the frame channel 4, the two parts, namely, the controller and the frame being thereby keyed together against rotation. A suitable spacing plate 88 is interposed between the channel frame 4 and the angle bracket 87, although this is not essential where the vertical leg of the angle bracket 87 may seat flat against the side of the frame.

Where the controller requires mounting above and away from the frame, as shown in Fig. 2, a suitable bracket such as 90 may be employed, this bracket having a hole at its upper end for the bolt 61 and having a hole at its lower end for a suitable bolt 91 which passes through the frame member 92. The bracket 90 has overlapping flanges for engaging the edges of the retaining plate 50 to prevent turning of the controller with respect to the bracket 90 and the bracket 90 has a lug or arm 93 extending below the frame member 92 so as to prevent turning of the bracket 90 with respect to the frame.

A great variety of mountings may be employed to conform to the requirements of the various cars and the different locations of the controller thereupon.

In Figs. 3 and 4 I have shown a form of mounting which is suitable for mounting the controller of the inside of a channel frame member 94, this mounting comprising the channel shaped clamp 48 which has the inturned flanges 53 for engaging the teeth of the base 33 of the bracket 34. This base 33 and its plate 50 forms a bar or key by means of which the base member 3 of the controller is held against turning. The sides of the bracket 48 which bear the inturned flanges 53 may be pulled towards each other, as by means of the bolts 95, which thereby firmly clamp the bar or key above mentioned between them. At the same time the through bolt 61' which is made of a suitable length in this case, extends through the web of the channel and through the bottom of the channel shaped bracket to clamp the entire assembly firmly in place to the chassis frame 94. At its lower end the sides of the bracket member 48 have hooks 96 which assist in further holding the bracket 48 firmly upon the channel member 94.

In applying the device the cover member 7, which is loosely held upon the base plate 20, is removed and the cable 9 is then connected between the drum 1 and the bracket or clip 97, and the holding key 18 which holds the retrieving spring against expansion is then released, whereupon the cable 9 is drawn taut. The cable 9 has at its upper end a suitable member for attachment to and detachment from the flange 15 of the drum 1. This attaching means is shown in Figs. 7, 8, 9 and 10 in detail and it comprises a main body portion 100, shaped generally like a sleeve and sweated or soldered upon the end of the wire cable 9. The hook member 99 is formed of sheet metal with two lugs 101 and 102 extending from the edge of the sheet metal where the same closes up to form the main body portion 100. From the central part of the body portion a lug or ear 103 is struck up and extends substantially diametrically away from the hooks 101 and 102. The ends of the hooks 101 and 102 are bent up as shown in Figs. 7, 9 and 10, so that when these hooks enter the slots 16 in the flange 15, they are not readily displaced laterally.

In applying the device, as shown in Fig. 1, the bracket 97, which is shown separately in Figs. 28 and 29, is first clamped in place against the axle or spring clip and the end of the cable 9 bearing the hook 99 is threaded up through the closed slot 104 and then the hooks 101 and 102 are hooked into slots 16 in the drum member 1, and the key 18 is released. The retrieving spring 10 then draws the cable 9 taut and the cover member 7 is placed over the drum member and is fastened to the base member 3 by inserting the ears 65 in the corresponding slots 19 to leave the opening 8 in said housing 7 in suitable position to permit free movement of the cable 9, and then the ears 65 are bent over and the cap screw 63 is threaded into place. The cable 9 has a suitable button 105 secured upon the lower end thereof, this button being preferably of spherical contour where it engages the co-operating spherical surface 106 in the bracket 97. The button 105 may be sweated or soldered upon the end of the cable, or it may be shrunk thereupon by swaging, as is well understood by those skilled in the art. Likewise the hook member 99 may be secured upon the upper end of the cable by swaging instead of soldering, although I find that where the hook member 99 is made of sheet metal it is preferable to solder or weld hook member 99 to the upper end of the cable 9.

Attention is called to the fact that when the hook member 99 is secured to the flange 15 of the drum member 1 and the cover member 7 is put in place, the lug 103 which extends from the hook member 99 lies against the outer surface of the drum and under the adjacent part of the housing 7, so that the hooked or bent ends of the hooks or lugs 101 and 102 cannot become disengaged from the slots 16. The sleeve member 100 is preferably given a curvature substantially the same as that of the groove in the drum 1.

The operation of the device is believed to be apparent from the foregoing explanation and description. The stationary frame, which includes the key or bar 33 at the back, the base plate 20, the arm 6, the pin 5, and the spring cup or housing 46, is all mechanically integral and in the embodiment disclosed is stationary. The band 2 is connected to the stationary part and is likewise held against rotation, although it is free to expand radially. The drum 1 with its cable groove and its bearing sleeve and attached cable is movable. When the drum is rotated in a clockwise direction, as viewed in Fig. 5, the friction between the rotatable drum 1 and the band 2 tends to drag the free end of the band circumferentially, thereby automatically expanding the band 2 into closer contact with the friction surface of the drum. This is due to the fact that the friction of successive elements of the band accumulatively increase by the tendency of the band to be dragged with the drum. The spring 70 affords sufficient initial friction that this action is possible.

For sudden or high velocity of motion between the drum and band the coefficient of friction rises. That is to say, the coefficient of friction between the drum and the band varies as a function of velocity of relative movement between them. This is characteristic of the leather bearing face engaging the smooth steel surface.

The compounding of the friction is a function of the flexible brake band construction. The tendency for the remote end of the band to resist relative movement forces all the intermediate elements into closer engagement, that is, increases the pressure as a function of the coefficient of friction. Now that resistance to movement, i. e., total friction, is a function of unit pressure, area of contact, and coefficient of friction $F = f.A.P$: Where F is total friction, $f$. is coefficient of friction, A is area of contact and P is applied unit pressure.

By the mechanical structure the applied unit pressure is controlled by the coefficient of friction, in other words $P = Kf$ where K is a constant factor. Hence it will be seen that $F = Kf^2 A$ and as area of contact is substantially constant at all times it may be merged in the constant K, and then it will be seen that $F = K'.f^2$.

From the above it is readily seen why I am able to secure such a great variation in total friction.

The friction surface, that is, the leather might have its flesh side secured to the band and its grain side bear on the inside of the drum member 1, but I find that arrangement which I have provided is preferable. Primarily it leaves the band 2 more flexible and capable of securing a better and more uniform fit between the two co-operating surfaces. I do not intend to be limited to securing the friction surface to the drum, but may apply the same to the band without departing from the invention. When the vehicle spring 108 is compressed, the frame member 4 approaches the axle 107 and the retrieving spring 10 turns the drum 1 in a counter clockwise direction, as viewed in Figs. 1 and 5, to retrieve the cable 9. As the drum is rotated in a counter clockwise direction, the friction between the drum and the shoe tends to drag the free end of the shoe in a direction to compress the spring 70 and to collapse the band 2. By this collapse of the band 2 the friction is decreased substantially to zero and the retrieving spring quickly takes up the slack in the cable and is prepared for the next operation, namely, expansion of the vehicle spring, whereupon the cable 9 is unwound from the drum, and the friction surface of the drum moves in a clockwise direction with respect to the shoe, as shown in Fig. 5, with the result that the shoe is expanded and the friction is increased to oppose the expansion of the main vehicle spring.

There are numerous structural and operating advantages which will be apparent from the foregoing detail description.

I do not intend to be limited to the details shown or described.

I claim:

1. In combination, a stationary trunnion, a hollow drum member having a central bearing sleeve rotatably mounted on said trunnion, a flexible tension member wound upon the drum, said drum having an internal friction facing, a relatively non-rotatable expanding brake shoe for engaging said facing, and spring means for rotating the drum to take up the slack in the tension member.

2. In combination, a stationary trunnion, a hollow drum member having a central bearing on said trunnion, said drum member having a groove on its outer periphery adjacent one end, a cable lying in said groove, a friction ring internally mounted on said drum, a flexible split brake band having an extension spring between the split ends thereof, and spring means in the drum for moving the drum with respect to the band to take up the slack in the cable.

3. In combination, a stationary trunnion mounted at one end, a hollow drum member having one side open and having a central bearing sleeve secured to the opposite end, said sleeve being rotatably mounted on said trunnion, a flexible tension member wound upon the outside of the drum, said drum having an internal friction face, an expanding brake shoe for engaging said face and held against movement therewith, and spring means for rotating the drum to take up the slack in the cable.

4. In a device of the class described, a cup-shaped stamping of sheet metal comprising an open flanged rim having an inwardly formed peripheral groove adjacent said flanged rim, said rim having a series of slots therein spaced about the periphery thereof, said stamping having an internal cylindrical seat for a band of friction material.

5. In combination, a stationary trunnion supported at one end, a cover plate on said supported end of the trunnion, a hollow drum open at one end and having a central bearing sleeve secured at the other, said bearing sleeve being rotatably mounted on said trunnion, a flexible tension member wound upon the drum, said drum having an internal friction face, an expanding brake shoe for engaging said face, spring means for rotating the drum to take up the slack in the cable, said drum and cover plate having cooperating recesses and holding means mounted in said recesses for preventing expansion of the spring.

6. In combination, a hollow drum member having a central bearing sleeve, a cover plate for the open end of said drum member, a bearing pin extending from the cover member cooperating with the bearing sleeve, said drum member having an internal friction face, a relatively stationary brake shoe cooperating with said friction face, a spring for rotating the drum with respect to the cover plate, said drum having a flange, said flange and said cover plate having notches adapted to be brought into register, and a pin for said notches for holding the drum and cover plate against rotation with respect to each other to prevent expansion of the spring.

7. In a device of the class described, the combination of a cup-shaped stamping of sheet metal comprising an open flared rim having an inwardly formed peripheral groove adjacent said flared rim, said rim having a series of slots therein spaced about the periphery thereof, said stamping having an internal cylindrical seat for a band of friction material, an internal expanding shoe cooperating with said stamping, a cover plate for the flared end of the stamping, said cover plate having a series of slots therein spaced about the periphery thereof and adapted to register with the first named series of slots, means for engaging the slots in both the rim and the cover plate for holding the parts against relative movement, and a cable having anchoring means adapted to enter the slots in the rim.

8. In a device of the class described, a cup-shaped stamping of sheet metal comprising an open flared rim having an inwardly formed peripheral groove adjacent its flared rim, said rim having a series of slots therein spaced about the periphery thereof, said stamping having an internal cylindrical seat for a band of friction material, a band of friction material therein, said stamping providing a radially inwardly extending shoulder at each side of the band of friction material for confining said band.

9. In a device of the class described, a cup-shaped stamping of sheet metal comprising an open flared rim having an inwardly formed peripheral groove adjacent said flared rim, said rim having a series of slots therein spaced about the periphery thereof, said stamping having an internal cylindrical seat for a band of friction material, a leather liner forming a band of friction material and secured in said cylindrical seat, said stamping providing radially extending shoulders for confining said liner.

10. In combination, a hollow drum having an external round cable groove, a cable in said groove, an internal cylindrical brake surface lying at one side of said groove, an expanding brake shoe cooperating therewith, and spring means in the drum for rotating the drum to take up the slack of the cable.

11. In combination, a cylindrical drum having a cable groove at one edge thereof, said drum having an internal friction surface, a stationary trunnion having an arm connected thereto, a flexible expanding friction shoe secured at one end to the arm and an expanding spring for expanding said shoe.

12. In combination, a cylindrical drum having a cable groove at one edge thereof, said drum having an internal friction surface, a stationary trunnion having an arm connected thereto, a flexible expanding friction shoe secured at one end to the arm and an expanding spring for expanding said shoe, and friction material for increasing the friction between said shoe and said drum, said friction material affording greater resistance for rapid relative movement than for slow relative movement between said shoe and drum.

13. In combination, a cylindrical drum having an external cable groove, a cable in said groove, said drum having an internal friction surface of cylindrical shape, a stationary trunnion for the drum, said trunnion having an arm connected thereto, a flexible expanding friction shoe secured at one end to the arm, an expanding spring for expanding said shoe, a return spring for the drum for taking up the slack in the cable, and a lining of leather for increasing the friction between the shoe and the drum.

14. In a device of the class described, a cup-shaped body comprising a stamping of sheet metal having a cylindrical portion providing an internal seat for a brake strap, shoulders extending radially inward along the edges of said seat to confine the brake strap, one of said shoulders merging into an external cable groove, said body having an outwardly flared flange on the outside of the groove.

15. In a device of the class described, a cup-shaped body comprising a stamping of sheet metal having a cylindrical portion providing an internal seat for a brake strap, shoulders extending radially inward along the edges of said seat to confine the brake strap, one of said shoulders merging into an external cable groove, said body having an outwardly flared flange on the outside of the groove, and a series of openings in the flange for attaching a cable.

16. In a device of the class described, a cup-shaped body comprising a stamping of sheet metal having a cylindrical portion providing an internal seat for a brake strap, shoulders extending radially inward along the edges of said seat to confine the brake strap, one of said shoulders merging into an external cable groove, said body having an outwardly flared flange on the outside of the groove, and a series of openings in the flange for attaching a cable, and a cable lying in said groove, said cable having a laterally extending finger for hooking into one of said openings.

17. In a device of the class described, a cup-shaped body comprising a stamping of sheet metal having a cylindrical portion providing an internal seat for a brake strap, shoulders extending radially inward along the edges of said seat to confine the brake strap, one of said shoulders merging into an external cable groove, said body having an outwardly flared flange on the outside of the groove, a series of slots in the flange spaced about the periphery thereof adjacent the groove, and a cable lying in the groove, said cable having a collar on the end thereof, said collar having a laterally extending projection for engagement in one of the slots and having an arm adapted to lie outside of the groove against the outside of the cylindrical portion.

18. In a device of the class described, a cup-shaped body comprising a stamping of sheet metal having a cylindrical portion providing an internal seat for a brake strap, shoulders extending radially inward along the edges of said seat to confine the brake strap, one of said shoulders merging into an external cable groove, said body having an outwardly flared flange on the outside of the groove, a series of slots in the flange spaced about the periphery thereof adjacent the groove, and a cable lying in the groove, said cable having a collar on the end thereof, said collar having a laterally extending projection for engagement in one of the slots and having an arm adapted to lie outside of the groove against the outside of the cylindrical portion, and a cylindrical cover member lying outside the cylindrical portion and the groove, said arm being confined by said cover.

19. In a device of the class described, a rotatable drum member having an internal brake surface and an external cable track, a cable on said track and a stationary internal expanding shoe cooperating with said drum, one end of said shoe being held against rotation and both ends being free to expand radially.

20. In a rotatable device of the class described, a drum member having an internal brake surface and an external cable groove and an internal expanding brake shoe cooperating with said drum.

21. In a device of the class described, a cup-shaped drum member having an internal brake surface and an external cable groove, and a central bearing sleeve comprising a tubular member having a base flange, said base flange being secured to the bottom of the cup, said tubular member having a finger struck laterally out of the metal thereof for attachment to the end of a return spring.

22. In combination, a cylindrical drum member having an external cable groove, a stationary trunnion member forming a bearing for the drum, said drum having an outwardly extending flange with a series of slots therein, means extending laterally from said trunnion and being connected thereto, said means having a slot therein adapted to register with a slot on the flange, a pin adapted to enter the slot for holding the drum rigidly in position, and a cable having an anchor on its end adapted to enter one of said slots.

23. In combination, a stationary supporting trunnion, a drum member having an external cable groove, said drum member having a bearing on said trunnion member, said cable groove being positioned adjacent the base of the supporting trunnion, said drum providing an internal cylindrical friction face, an expanding self tightening flexible brake shoe having one end non-rotatably connected to the trunnion, spring means engaging the free end of the band to expand the flexible shoe, a return spring connected between the trunnion and the drum for rotating the drum in a direction to take up the slack of the cable and simultaneously contracting the brake shoe against its expanding spring.

24. In a device of the class described, a brake drum having a cable groove, a series of slots at one side of the groove, a cable lying in the groove, a collar on the end of the cable, said collar having a laterally extending finger adapted to lie in one of the slots.

25. In combination, a drum member having a cable groove and a laterally extending flange, a cable lying in the groove, said flange having a series of slots therein spaced about the periphery thereof, said slots being arranged in pairs, a sheet metal sleeve secured on the end of the cable, a cable in the groove, said sheet metal collar having integral lugs extending laterally and engaging in a pair of said slots.

26. In combination, a drum member having a cable groove and a flange at one side of the cable groove, a series of slots arranged about the periphery of the flange, said slots being arranged in pairs, a cable in the groove, said cable having a sheet metal sleeve at one end, said sleeve having at its ends laterally extending lugs for engaging in a pair of said slots, and a central oppositely disposed lug lying on the outside of the drum adjacent the groove.

27. In combination, a drum member having a cable groove and a flange at one side of the cable groove, a series of slots arranged about the periphery of the flange, said slots being arranged in pairs, a cable in the groove, said cable having a sheet metal sleeve at one end, said sleeve having at its ends laterally extending lugs for engaging a pair of said slots, a central oppositely disposed lug lying on the outside of the drum adjacent the groove, and a circumferential restraining member being securely mounted outside of the drum and groove, said arm lying between the arm and said restraining member.

28. In combination, a brake drum having a cable groove at one side thereof, said cable groove having an outwardly extending flange, said flange having a series of pairs of slots, a stationary cylindrical cover member outside the drum and groove, a cable in the groove, said cable having a collar on the end thereof, said collar having a pair of lugs extending laterally from the ends thereof, said lugs being adapted to engage in a pair of said slots, the lugs being hooked to prevent disengagement with the slots, said sleeve having a laterally extending arm adapted to lie between the drum and the cover to prevent unhooking of the lugs from the slots.

29. In a device of the class described, a brake drum having a central bearing, a cover plate for one end of said drum, a slip brake shoe in said drum, a cup having its closed end lying against the cover plate, an L-shaped bracket having its base lying on the back side of said cover plate and its arm extending through said plate, said arm operatively connected to one end of said brake shoe, spring means for automatically expanding the brake shoe upon braking motion of the drum, a return spring connected between the cup and the drum, and a bearing stud for the drum, said stud passing through the cup, the plate, and the bracket and holding said parts securely together.

30. In a device of the class described, a brake drum having a central bearing, a cover plate for one end of said drum, a split brake shoe in said drum, a cup having its closed end lying against the cover plate, an L-shaped bracket having its base lying on the back side of said cover plate and its arm extending through said plate, said arm operatively connected to one end of said brake shoe, spring means for automatically expanding the brake shoe upon braking motion of the drum, a return spring connected between the cup and the drum, a bearing stud for the drum, said stud passing through the cup, the plate and the bracket and holding said parts securely together, and a mounting bracket engaging the base of said L-shaped bracket.

31. In combination, a cylindrical brake drum having a concentric bearing sleeve, a cover plate for one end of the drum, a cup having its bottom lying against the cover plate, a concentric bearing pin secured to the bottom of the cup, a return spring lying within the cup, said spring being connected between the cup and the sleeve of the drum, an automatic expanding brake shoe disposed within the drum and co-operating therewith, said shoe lying outside the cup, and means rigid with the cup for holding one end of the brake shoe relatively stationary.

32. In combination, a stationary bearing stud, a cylindrical brake drum bearing on said stud, a cover plate for the drum, an expanding brake shoe cooperating with the drum, an anguar bracket having its base lying outside of the cover plate and its arm extending through the cover plate and operatively engaging one end of the brake shoe, and means secured to the base of said bracket for holding the device upon a stationary support.

33. In combination, a stationary frame member having an upturned arm, a stationary bearing stud secured to the base of said frame member, a cylindrical brake drum having a bearing sleeve on said stud, an expanding brake shoe co-operating with the inside of the drum, one end of the shoe being connected to said upturned arm, said drum having an external cable groove and a cover member for the drum, said cover member comprising a cup having its open mouth secured to the frame member and its bottom connected to the stud and having a slot in register with the cable groove on the drum.

34. In combination, a frame member having a base, an outwardly extending arm, a stud secured to said base, a brake drum having a bearing sleeve mounted on said stud, a brake shoe for the drum secured at one end to said arm, a spring housing mounted on said frame member and a return spring connected between the bearing sleeve of the drum and said spring housing.

35. In combination, a frame member having a circular flange, a concentric bearing stud, a brake shoe engaging arm, and a spring housing, a co-operating brake drum having a head at one side and being open at the other, said head having a bearing sleeve concentric with the drum, said bearing sleeve co-operating with the bearing stud, a spring connected between the spring housing and said bearing sleeve, and a brake shoe in the drum co-operating with the brake shoe holding arm.

36. In a device of the class described, the combination of an open sided brake drum, an automatic expanding brake shoe in the drum co-operating therewith, a spiral actuating spring in the drum, an L-shaped bracket reaching around the spring and having its upright arm connected to one end of the brake shoe, a bearing stud extending from the base of the bracket, and a bearing sleeve for the drum rotatably mounted on said stud.

37. In a device of the class described, the combination of an open sided brake drum, an automatic expanding brake shoe in the drum co-operating therewith, an L-shaped bracket having its upright arm connected to one end of the brake shoe, a bearing stud extending from the base of the bracket, a bearing sleeve for the drum rotatably mounted on said stud, and means secured to the base of the bracket for mounting the device upon a support.

38. In a device of the class described, the combination of an open sided brake drum, an automatic expanding brake shoe in the drum co-operating therewith, a frame member comprising a plate for the open side of the drum, a bearing stud extending from said plate, a bearing sleeve for the drum mounted on said stud, an arm rising from the plate, said arm co-operating with one end of the brake shoe to hold the brake shoe against rotation, a stationary cup shaped housing for the drum member, said housing having its open side connected to the same and its closed side connected to the stud.

39. In a device of the class described, the combination of an open sided brake drum, an automatic expanding brake shoe in the drum co-operating therewith, an L-shaped bracket having its upright arm connected to one end of the brake shoe, a bearing stud extending from the base of the bracket, a bearing sleeve for the drum rotatably mounted on said stud, a cover plate mounted on the base of the bracket for closing the open side of the brake drum, and a mounting bolt passing through the stud and bracket for holding the device upon a stationary support.

40. In a device of the class described, the combination of an open sided brake drum, a head for the opposite side of the drum, a bearing sleeve mounted on said head, a base member having a bearing stud co-operating with the sleeve, an internal expanding brake shoe co-operating with the drum, an arm on said base member engaging the one end of the brake shoe, and a cup shaped cover on the drum, the bottom of the cover being secured to the stud to hold the drum in position.

41. In a device of the class described, the combination of a rotatable brake drum having a head at one side and being open at the other, said drum having a flange at the open side and having a cable groove adjacent the flange, a stationary base plate closing said open side, said plate and flange having co-operating slots and co-operating cylindrical bearing members for the drum and base plate.

42. In a device of the class described, the combination of a rotatable brake drum having a head at one side thereof and being open at the other side, said drum having a flange at the open side with a cable groove adjacent the flange, a stationary base plate closing said open side of the drum, said plate and flange having co-operating slots and co-operting cylindrical bearing members for the drum and plate, and a cable in the groove, said cable having an attaching hook for engaging in the slot in the flange.

43. In a device of the class described, the combination of a rotatable brake drum having a head at one side thereof and being open at the other side, said drum having a flange at the open side, a cable groove adjacent to the flange, a stationary base plate closing said open side, co-operating cylindrical bearing members for the drum and the plate, and a ring of sealing material secured to the plate and co-operating with the inside of the drum where said cable groove is formed.

44. In combination, a base member having a bearing stud, an open sided brake drum having a bearing sleeve secured thereto, said drum having a cable groove with slots therein for the attachment of a cable, a spring cup having its bottom secured to the base member, said cup having a slot for the attachment of a coil spring, this bearing sleeve having a hook for the attachment of a coil spring, and a coil spring disposed in the cup and connected between the cup and the sleeve.

45. In combination, a base member having a bearing stud, an open sided brake drum having a bearing sleeve secured thereto, said drum having a cable groove with slots in the drum adjacent the groove for the attachment of a cable either left or right, a spring cup having its bottom secured to the base member, said cup having a slot for the attachment of one end of a coil spring either left or right, said sleeve having hooks for attaching the other end of a coil spring either left or right, and a coil spring disposed in said cup and restrained against expansion thereby, said spring being hooked into the slot and one of the hooks on said sleeve.

46. In a device of the class described, a brake shoe comprising a flexible metal band having upturned ends, an expansion coil spring disposed between said upturned ends and a U-shaped seat adjacent one end for embracing a holding member.

47. In a device of the class described, a brake shoe comprising a flexible metal band having upturned ends and an expansion coil spring disposed between said upturned ends and a U-shaped seat adjacent one end for embracing a holding member, said seat having means for engaging the holding member to prevent axial displacement of the band.

48. In a device of the class described, a brake shoe comprising a flexible metal band having lugs at the ends thereof, an expansion coil spring disposed between said lugs, and a U-shaped plate secured adjacent one end of the band, said plate having a lug struck up between the sides of the U.

49. In a device of the class described, a brake shoe comprising a flexible metal band having an expansion coil spring disposed between the ends of the band and a U-shaped holding member having radial shoulders permitting free radial expansion of the end of the band, but preventing circumferential motion thereof in either direction, said holding means being secured to the band adjacent one end thereof.

50. In a device of the class described, a brake shoe comprising a flexible metal band having upturned ends and an expansion coil spring disposed between said upturned ends, and a U-shaped holding lug extending substantially radially from one end of said band, said lug permitting free expansion of said end of the band outwardly.

51. In a device of the class described, a brake shoe comprising a flexible metal band having lugs at the ends thereof, said ends being brought close to each other, an expansion spring connected to said lugs for expanding the shoe, a stationary holding member and a reenforcing plate mounted on one end of the shoe, said plate having a loose connection with said holding means permitting radial movement of the end of the band but holding the same nonrotative with respect to said holding means.

52. A brake shoe comprising a continuous flexible metal strip having lugs on the end thereof, an expansion spring guided between said lugs, a reenforcing plate lying inside the band adjacent one end, said plate being spot welded to said strip and having substantially radially disposed shoulders for cooperating with a stationary bracket.

53. In combination, a cylindrical brake drum having an internal brake surface, a shoe co-operating therewith, said shoe comprising a metal strip having its ends brought closely together, an expansion spring between said ends, a stationary arm adjacent one end of the shoe, a reenforcing strip having a U-shaped socket for engaging the sides of said arm, said reenforcing strip being secured to one end of the shoe.

54. In combination, a brake shoe comprising a thin metal strip having its ends brought adjacent each other, a spring between the ends of the shoe, a reenforcing plate mounted on one end of the shoe, said plate providing an open U-shaped saddle.

55. In combination, a brake shoe comprising a thin metal strip having its ends brought adjacent each other, a spring between the ends of the shoe, a reenforcing plate mounted on one end of the shoe, said plate providing a saddle, and a stationary arm seated in said saddle and permitting the adjacent end of the shoe to float radially.

56. In combination, a brake shoe comprising a thin metal strip having its ends brought adjacent each other, a spring between the ends of the shoe, a reenforcing plate mounted on one end of the shoe, said plate providing a saddle, and a stationary arm seated in said saddle and permitting the adjacent end of the shoe to float radially, said plate having a lug extending up from the same, and said arm having a notch for receiving the lug to hold the shoe against lateral displacement.

57. In combination, a metal strip forming a brake shoe, said strip having its ends upturned, an expansion spring between the upturned end, a reenforcing plate mounted on the strip adjacent one end thereof, said strip and plate having inter-engaging projections and recesses for registering the plate on the strip, said plate having raised portions providing a saddle, said plate being spot welded to said strip.

58. In a device of the class described, a stationary frame member and a rotatable drum thereupon, said frame member comprising a bearing stud for the drum, a spring anchor, and a brake holding arm, said rotatable drum comprising internal cylindrical friction surface and an external cable groove, a cable in said groove, an automatic expanding brake shoe having one end held by said arm, a spring for expanding the shoe, and a return spring for taking up the slack in the cable, said spring being connected between said drum and said spring anchor.

59. In a spring controller, a drum having an internal cylindrical surface furnished with a peripherally continuous friction facing, a co-operating automatically expanding brake shoe, means for causing relative rotation between drum and shoe, said expanding brake shoe comprising a strip of sheet metal frictionally engaging said facing, a brake holding arm connected to one end of the shoe to permit free radial movement thereof, and a spring connected between said one end and the free end of said shoe.

60. In a spring controller, a base member having a bearing pin, a brake drum having a sleeve mounted on said bearing pin, an internal expanding brake shoe co-operating with said drum, a bracket mounted on said base member, said bracket holding one end of the brake shoe against movement, a spring for expanding the brake shoe, a spiral spring lying within the brake shoe, a cylindrical spring housing connected to one end of said spring, the other end of the spring being connected to the bearing sleeve of the drum member.

61. In a spring control, the combination of a pair of friction surfaces, one of which comprises an internal expanding brake shoe, the co-efficient of friction of which surfaces varies as a function of the speed of relative movement, and means for controlling the applied pressure of said surfaces against each other as a function of the co-efficient of friction.

62. In a spring control, a drum member and a flexible internal expanding band member therefor, one of said members having a surface of leather, the other member having a smooth metallic surface co-operating with said leather, said band member being adapted to be pressed against said drum member with a force varying with the co-efficient of friction between said members.

63. In a vehicle spring controller, the combination of a pair of relatively movable friction elements, the co-efficient of friction of which increases with velocity of relative movement, one of said elements comprising an internal expanding brake shoe and having means for compounding the frictional effect between said elements to cause the total friction between the elements to vary as an exponential function of the relative velocity of movement.

64. In a spring controller, the combination of a drum having a lining of friction material, a flexible expanding brake band of metal, the co-efficient of friction of said lining and band increasing with increased velocity of relative movement between them, and means for applying a torsional couple of force to the drum and to the band to cause relative movement, said means applying pressure to one end of the brake band tending to push it around and simultaneously expand it.

65. In a device of the class described, a drum having a retrieving spring of limited angular displacement, cooperating friction means inside the drum actuated by said drum, a separate cable for mounting on said drum, said cable being of a fixed length, a plurality of slots arranged about the periphery of the drum, and a hook on the end of the cable for hooking into said slots to take up the initial slack of the cable.

66. In a device of the class described, a drum having a retrieving spring of limited angular displacement, cooperating friction surfaces inside the drum actuated by said drum, a separate cable of fixed length having catch means at its upper end, said drum having a plurality of shoulders disposed about the periphery of the drum for engagement by the catch on the end of the cable, and means for holding the drum to prevent expansion of said spring before said cable is attached to said drum.

67. In a device of the class described, a brake drum having a brake lining, a flexible metal band engaging said lining, means for spreading the band, and means for pushing against one end of the band, said means permitting free radial play of said end of the band, said end of the band being stiffer than the opposite end to take up the increased stresses upon said end of the band.

68. In a device of the class described, a flexible brake band of generally circular configuration and spring means for expanding the band, said band having anchoring means at one end, said anchoring means being formed of graduated width toward said anchor end of the band and being rigidly secured to said band.

69. As an article of manufacture, a circular brake band comprising a flexible spring metal strip having a free end and an anchor end, said band having a wedge shaped stiffening plate for increasing the stiffness of the anchor end of the band, said plate being spot welded to said band.

70. In combination, a brake band comprising a strip of spring sheet metal having the grain of the metal extending longitudinally of the band, said band having a free end and an anchor end, and a backing member overlying the anchor end and tapering off toward the free end.

71. In a controller of the class described, the combination of a base member having a diametrically disposed mounting bar upon the bottom thereof, notches along the side edges of said bar, and a co-operating mounting bracket having notched jaws for engaging the sides of said bar.

72. In a controller of the class described, the combination of a base member having a diametrically disposed mounting bar upon the bottom thereof, the side edges of said bar being notched, and a plate mounted on said bar, said plate having its edges extending beyond the notched edges of the bar to form retaining flanges.

73. In combination, an anchor plate having a bearing stud, a drum rotatable on said stud, a thrust washer on the free end of the stud, a retaining member on the stud beyond the washer and a cover member connected to said washer and to said anchor plate to key said parts together.

74. In combination, a mounting plate having a bearing stud projecting therefrom, a brake member having a sleeve bearing on said stud, a retaining member on the end of said stud, and a cover shell having a washer lying between said retaining member and the sleeve and the end of the bearing sleeve, said cover shell being secured against rotation by engagement with the mounting plate.

75. In combination, an anchor plate having a trunnion stud, a brake drum bearing on said stud, a thrust washer at the free end of said stud to hold the drum laterally against coming off the stud, and an extension from said washer to said anchor plate to keep said washer from turning.

76. In a device for controlling the movement of one element with respect to another, the combination of a pair of friction members, said members being connected respectively to said element for producing relative motion between the members, one member comprising a self applying brake shoe and the other member comprising a brake drum engaged thereby, the pressure of the shoe upon the drum being controlled by the co-efficient of friction between them, said members having coacting surfaces, the co-efficient of friction between which varies as a function of velocity of movement of said surfaces relative to each other.

77. A shock absorber comprising two friction surfaces, the total friction between which is controlled as an exponential function of the relative velocity of movement between them.

78. The combination of a fixed element, an annular rotatable element disposed about said first element, a brake shoe disposed adjacent the inner periphery of said rotatable element, means mounted on said fixed element adapted to prevent rotation of said shoe but permit radial movement thereof, and means for expanding the ends of said shoe to engage with said rotatable element, said means acting upon the ends of said shoe.

In witness whereof, I hereunto subscribe my name this 13th day of October, 1925.

FRANK C. MOCK.